Dec. 12, 1967    F. K. PREIKSCHAT    3,358,149
OPTICAL CORRELATOR WITH ENDLESS GREASE BELT RECORDER
Filed Aug. 17, 1964    2 Sheets-Sheet 1

INVENTOR.
FRITZ K. PREIKSCHAT
BY Charles J. Ungemach
ATTORNEY

Dec. 12, 1967  F. K. PREIKSCHAT  3,358,149
OPTICAL CORRELATOR WITH ENDLESS GREASE BELT RECORDER
Filed Aug. 17, 1964  2 Sheets-Sheet 2

INVENTOR.
FRITZ K. PREIKSCHAT
BY *Charles J. Ungemach*
ATTORNEY

United States Patent Office 3,358,149
Patented Dec. 12, 1967

3,358,149
OPTICAL CORRELATOR WITH ENDLESS GREASE BELT RECORDER
Fritz K. Preikschat, Bellevue, Wash., assignor to Honeywell Inc., Minneapolis, Minn., a corporation of Delaware
Filed Aug. 17, 1964, Ser. No. 389,996
7 Claims. (Cl. 250—219)

ABSTRACT OF THE DISCLOSURE

A real time optical correlator in which the signal to be compared is displayed on a transparent moving belt by varying the thickness of a grease layer on the belt in accordance with the signal.

The present invention relates to signal pattern recognition apparatus and more particularly to a real time optical correlation system for discerning a predetermined signal or code which may be hidden in noise or interference. Although the invention is described herein as a signal pattern recognizer, it should be understood that the present invention may be used in many applications apparent to those skilled in the art of transmitting and receiving signals.

Prior art optical correlators are based upon the principle that when two photographic negatives, which are identical, are placed on top of each other so that they match, a maximum amount of light passes through because the transparent areas of one negative correspond exactly to the transparent areas of the other negative. If the two photographic negatives were not identical a lesser amount of light would pass through them.

Recently it has become desirable to provide a correlator which operates in "real time," that is, one which can compare a series of signals received from an outside source with a reference signal at the same rate that they are being received so that correlation between the two can be quickly determined. Optical devices for this purpose have several advantages over other types of correlators such as simplicity, low cost and accuracy. However, because of the time necessary to place the incoming signal on photographic film and process the film, prior art optical correlators have not been used in "real time" situations.

The present invention operates to provide a "real time" input for an optical correlator.

Briefly, in the present invention the input signal is scribed with the edge of a steel blade onto a layer of grease on a transparent belt. The grease is dyed so that its transparency varies with the thickness of the grease. The intensity of light passing through the reference film and the grease belt from a source behind the belt is monitored so that correlation between the reference and belt can be established.

Accordingly, it is an object of this invention to provide a real time optical correlator for recognizing or receiving signals. The details of the present invention will be further explained and clarified in the following description and drawings, in which.

Figure 1:
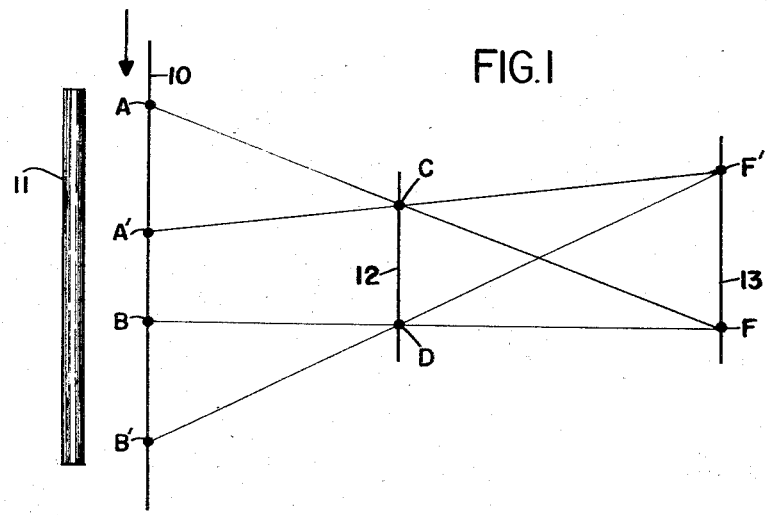
FIGURE 1 is a diagram illustrating the principle of operation of an optical correlator.

In FIGURE 1 a moving belt 10 is shown which has a received signal recorded on it as a series of alternate, varying transparent and opaque areas. A source of even illumination 11 is positioned behind belt 10 in order to project the recorded signal on and through a reference film 12 and thence to surface 13 which is parallel to belt 10. Reference 12 has the expected signal recorded on it as a similar series of opaque and transparent areas. Assume that a transparent area exists at points A and B on belt 10 and that similar points C and D are transparent on reference 12. Light from source 11 will travel through points A and B and some of this light will travel through points C and D so as to arrive at surface 13. A light ray will also travel from point A through point D and from point B through point C so as to arrive at surface 13. However, the ray from A through C will join with the ray from B through D at a point shown as F on surface 13 and the intensity of light at point F will be greater than at any other point on surface 13 to indicate correlation. At a later time, when belt 10 and the points A and B have moved to positions shown as points A′ and B′, the signal which is in register with reference 12 will focus at point F′, as shown in FIGURE 1 and still indicate correlation. Thus when the series of transparent and opaque areas on the reference film match those on the belt a maximum amount of light will pass through and a light detector positioned at F or F′ and sensing the maximum signal will indicated correlation between the received and expected signal. If reference 12 is made larger or positioned farther away from belt 10 the focus points will be moved farther away from belt 10 toward the right of surface 13. If it is made smaller or moved closer to belt 10 the focus points will be moved closer to belt 10 toward the left of the surface 13. If the same signal occupies a shorter distance than that between points A and B on belt 10, for instance due to a Doppler shift, the focus points will be beyond surface 13 and the light detector position should be altered to detect the Doppler shift. In normal operation a great many more than two transparent points will exist but in each case there will be a focus point where all of the rays meet provided that for each transparent portion on belt 10 a corresponding and proportionally placed transparent portion exists on reference 12. A maximum detected at the focus will thus show that the signal on belt 10 is correlated to or the same as the signal on reference 12.

Figure 2:
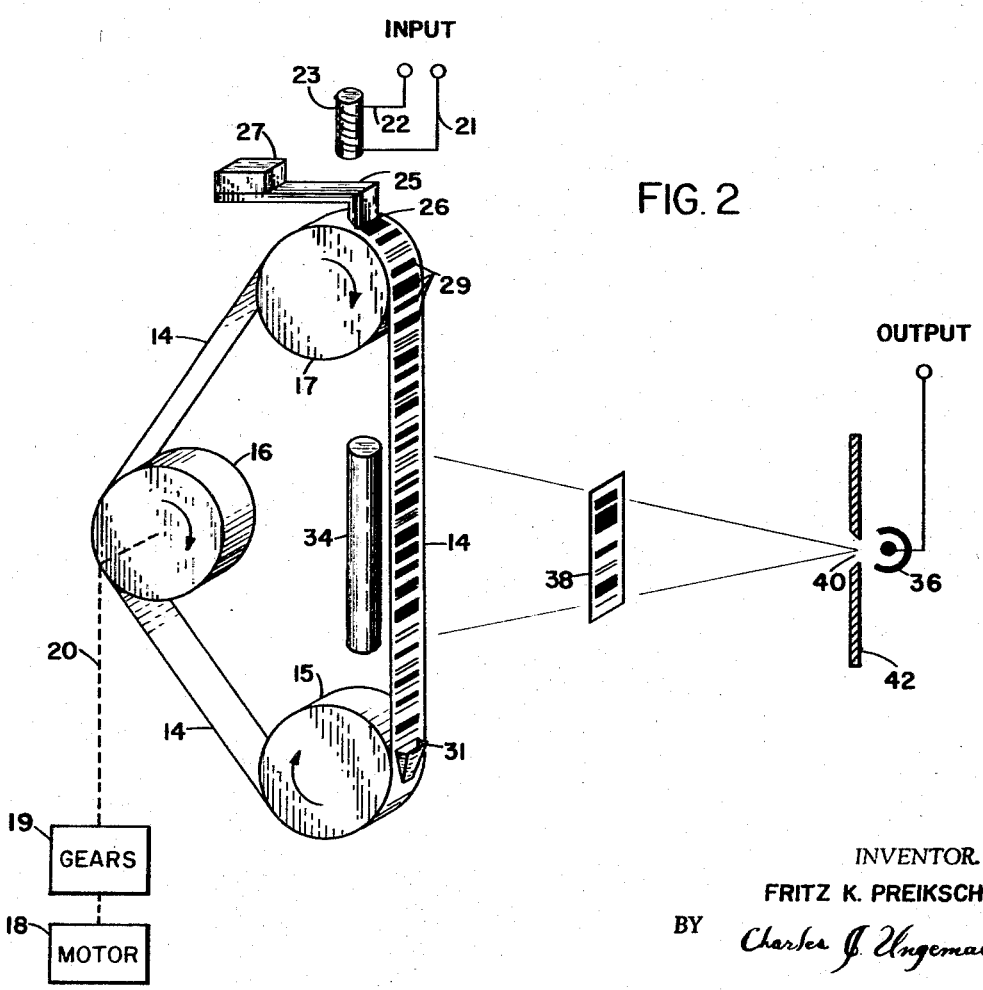
FIGURE 2 is a functional schematic drawing of one embodiment of my invention.

In FIGURE 2 a flat transparent grease covered belt 14 made of strong flexible material is shown supported by a set of rollers 15, 16 and 17. The belt is caused to circulate at a constant rate by a suitable driving device which may be a synchronized motor 18 and a gear train 19 connected to drum 16, for example. Signals, for example a train of pulses, are received from some outside source by apparatus (not shown) and after suitable amplification these input signals are presented to a pair of conductors 21 and 22 connected to an electromagnet 23. Magnet 23 operates to move a scribing blade 25 in accordance with the signals on conductors 21 and 22. Scribing blade 25 is shown having a scraper edge 26 which varies the thickness of the grease on belt 14. Edge 26 is suitably angled and beveled to deposit the excess grease along the edges of belt 14 so as to prevent the grease from piling up behind blade 25 and thus dropping out of circulation. The flat end of scribing blade 25 is fastened to a mounting block 27 so that the scraping edge 26 of blade 25 can vibrate freely under the action of magnet 23. To insure that blade 25 and edge 26 move in accordance with the input signal of electromagnet 23 the length and thickness of blade 25 are adjusted so that its natural resonant frequency is slightly above the desired frequency range of operation. For instance, for an input frequency of 500 cycles per second, the blade may be tuned to 550 cycles per second. This would allow substantially linear operation from zero to about 530 cycles per second because the resonant peak at 550 cycles per second is only about 20 cycles per second wide. A suitable material for blade 25 has been found to be hardened steel in which resonant frequencies up to 2000 cycles can be readily obtained with the system thus being operable from zero to slightly under 2000 cycles per second.

The up and down movement of the steel blade 25 caused by electromagnet 23 varies the thickness of the grease belt 14 causing a series of alternate areas of more or less transparency 29. This variation of transparency of belt 14 thus optically represents the electrical input signal.

It is often desirable to determine when a predetermined signal or sequence of pulses is received at the input. For example, in sonar receivers, a more or less continual background noise is always present and it is sometimes difficult to distinguish an identifying call from a sister vessel. With the present invention a code series of pulses can be agreed upon as identification and this "expected" signal used as a reference. If the expected signal is present among the background noise a maximum amount of light will pass through the belt and reference and correlation will be indicated.

The grease used should be one which will maintain a correct viscosity over a wide temperature range. The grease should flow evenly past 25 but should be stiff enough to resist flow caused by gravity. A satisfactory grease for this has been to be silicone grease, for example Dow-Corning-7 Compound. This grease may be dyed so that its transparency varies with the thickness of the grease. The grease may be made about 90% transparent for about .0001 inch thickness and about 10% transparent for about .001 inch thickness. A dye suitable for this use has been found to be, for example, Cyanamide Calco Nigrosine Base.

If foreign particles become attached to drum 17 they will alter the thickness of the grease when they pass under belt 14 while belt 14 is under blade 25. Thus, it may be desirable to place a stationary anvil immediately before the correlation area just behind the roller 17 supporting belt 14 from below. The scribing blade could be placed opposite the anvil to modulate the grease as it passes over the anvil just before the correlation area. The moving belt 14 would then scrape the anvil continuously and keep it free of foreign particles. Placing the scribing blade in this position, working against the anvil just before the correlation area, is also advantageous in that it allows the grease to be modulated just before the correlation area, leaving the least time delay for the correlation.

A scoop 31 shown in FIGURE 2 is used to smooth out the grease after it has passed the correlation area, to clear the edges and channel the grease back toward the center of the belt so that it will not be lost.

To illuminate belt 14, a suitable light source 34 is shown in FIGURE 2 which may be, for example, a neon lamp or stretched filament lamp. The intensity of illumination should be substantially constant over the entire correlation area of belt 14 so that all parts of the recorded signal are of the correct relative intensity. A photodiode 36 is shown in FIGURE 2 which monitors the intensity of the light from source 34 which passes through grease belt 14, a reference film 38, and a slit 40. Any sensor which will determine when a maximum amount of light is passed through belt 10 and reference 38 may be substituted for photodiode 36, for instance a Vidicon Scanner. Reference film 38 is at an appropriate distance from belt 14 and of the appropriate scale, determined by the speed of belt 14, so that the extended projection of the correlation area and reference 38 will focus on slit 40. For instance, if belt 14 was to circulate at a faster rate, the signal would occupy a longer length on belt 14 and thus reference slide 38 would have to be moved closer to slit 40, in order to focus the complete signal on slit 40.

It is desirable to enclose all of the elements of FIGURE 2 in an enclosure, not shown, so that dust and other foreign particles cannot become attached to the grease on belt 14 and cause streaks or imperfections in the grease surface and so that the spurious light may not enter detector 36.

Figure 3:
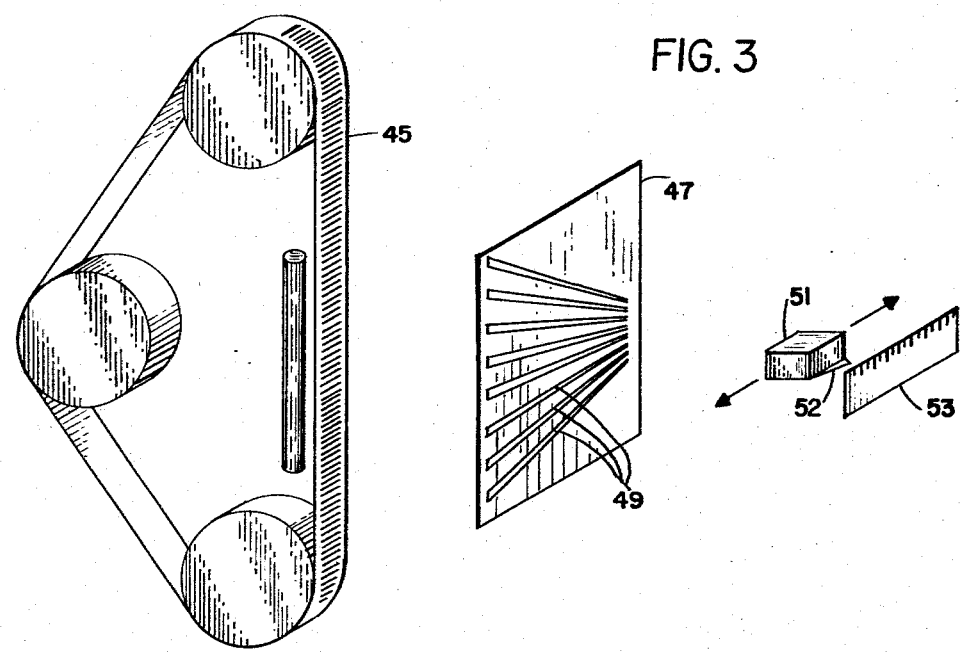
FIGURE 3 is a schematic drawing of another method of employing my invention.

FIGURE 3 schematically demonstrates a second application for my invention. This application involves measuring the Dopper-shift of a signal. In FIGURE 3 a grease belt modulator 45 operates in the same way as explained previously in regard to FIGURE 2. However, in FIGURE 3 a reference slide 47 has a number of slits 49 which are spaced proportionately farther apart toward the left side of slide 47 than they are toward the right side of slide 47. A light intensity detector 51 is provided which can move laterally toward the left or right. If a single frequency signal is recorded on grease belt modulator 45, optical correlation will occur between belt 45 and reference slide 47 only at the point where the slits 49 are the proper distance apart. By moving detector 51 to the left or right this point of correlation can be determined and the frequency thus indicated by a pointer 52 on a suitable scale shown in FIGURE 3 as scale 53.

The scheme in FIGURE 3 may be used in sonar velocity measuring equipment for instance. A sonar signal could be transmitted which corresponds to the frequency at the center of reference slide 47. If the signal was reflected off a moving target it would experience a change in frequency, commonly known as a Doppler-shift. If the target was moving away a lower frequency than was transmitted would be reflected, while if the target was approaching a higher frequency would be reflected. This reflected Doppler-shifted frequency would be recorded on the grease belt 45 and thence correlated with reference slide 47 by light detector 51. Since the transmitted signal corresponds in frequency to the center of reference slide 47 the distance to the left or right of center would indicate the change in frequency due to the Doppler-shift, and also whether the frequency had increased or decreased. For example, to the right of center of reference slide 47 the slits 49 are closer together indicating a higher frequency and an approaching target. Since the Doppler change in frequency would be proportional to the target's velocity the optical correlator could thus determine the velocity of the target and whether the target was moving toward it or away from it.

Alternately, Doppler-shifts can be measured by moving the detector toward or away from a reference which has a number of evenly spaced slits displayed on it. The Doppler-shift effect contracts or expands the recorded signal on the grease belt. Thus, with evenly spaced reference slits the focal point moves toward or away from the reference slide according to the amount of Doppler frequency shift.

Figure 4:
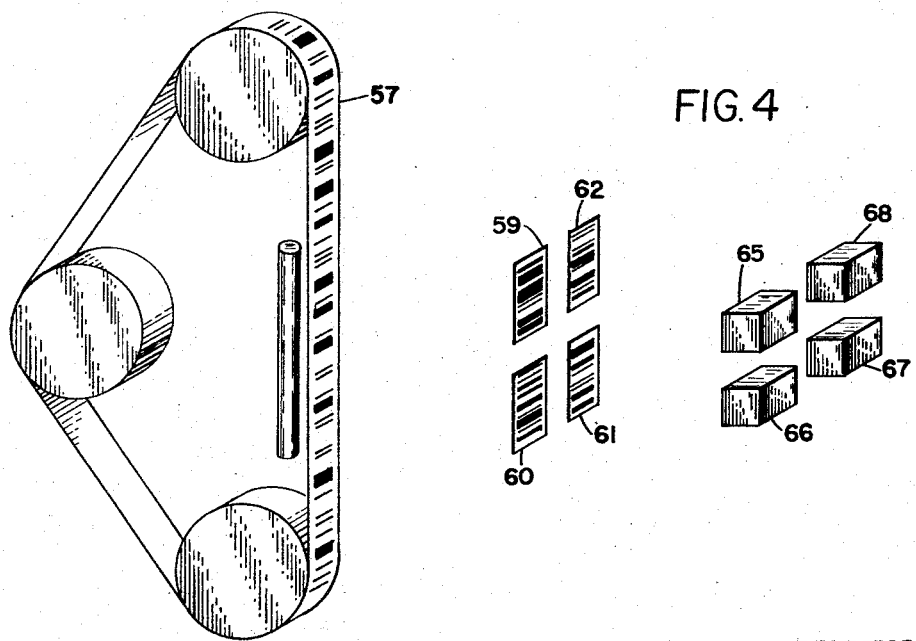
FIGURE 4 is a schematic drawing of still another use of my invention.

FIGURE 4 shows a number of correlative operations can be done simultaneously. In FIGURE 4 a grease belt modulator 57 is shown which is similar to the modulator of FIGURE 2. However, instead of only one reference slide a set of four slides 59, 60, 61, and 62 are shown. A group of four light intensity detectors 65, 66, 67 and 68 are arranged such that each detector is aligned with modulator 57, and its respective reference slide. For example, if a signal pattern arrives on modulator 57 and corresponds to reference slide 59 then detector 65 will be activated whereas if the pattern corresponds to reference 61 detector 67 will be activated. Thus, if four code patterns arrived simultaneously on modulator 57 and each corresponds to one of the reference slides 59, 60, 61, or 62, all of the detectors will be activated. Since a large number of reference slides and corresponding detectors may be used if desired, a large number of correlative functions can be performed at the same time. Another use would be to allow one reference slide and one corresponding detector to represent a letter of the alphabet. By utilizing 26 reference slides and detector combinations and having each combination actuate a suitable key on a typewriter, coded messages could be transmitted which would not be deciphered unless an optical correlator with the proper reference slides was available.

Although the invention has been described as using a positive reference to indicate positive correlation with a maximum amount of light intensity, a negative reference giving a minimum of light intensity for correlation could be used in the cited applications. In fact both negative and positive references could be used placed side by side, correlation being indicated by the occurence of simultaneous minimum and maximum as recorded by two detectors with the appropriate circuitry between them. Also it should be understood that visible light is not the only radiation that could be used in the present invention. For example, infrared radiation could be used in the present invention. For example, infrared radiation could be utilized as could many other forms of radiation.

It will be obvious to those skilled in the art that many modifications and variations of this device can be made without departing from the scope and spirit of the invention as defined by the claims.

I claim as my invention:

1. An optical correlator for recognizing signal patterns comprising:
   a transparent endless belt;
   means to move said belt at a predetermined rate;
   a layer of non-drying grease on the belt, said grease having an optical transmittance dependent upon the thickness of said grease;
   mechanical means to vary the thickness of said grease in accordance with an input signal;
   reference means, said reference means having alternate transparent and opaque areas representative of a predetermined signal pattern;
   light intensity measuring means;
   illuminating means operative to transmit light through said belt, said grease, and said reference means into said measuring means, said measuring means detecting changes of intensity in accordance with the degree of similarity between said input signal and said predetermined signal pattern,
   and smoothing means to smooth the grease for immediate reuse.

2. In a system for the determination of the frequency of an input signal, a device as defined in claim 1 wherein said reference means further comprises a plurality of slits, said slits being spaced differently along their length so that correlation between the slits and said belt may occur at one place along said length; and
   wherein said measuring means is operable to determine said place as an indication of the frequency of said input signal.

3. An optical correlator for recognizing signal patterns comprising in combination:
   a transparent endless belt which moves as a function of time;
   non-drying grease on the belt, said grease having an optical transmittance dependent on the thickness of said grease;
   mechanical means to vary the thickness of said grease means in accordance with an input signal;
   reference means, said reference means having alternate transparent and opaque areas representative of a predetermined signal pattern;
   light intensity measuring means;
   illuminating means operable to transmit light through said belt, said grease, and said reference means into said measuring means, said measuring means detecting changes of intensity in accordance with the degree of similarity between said input signal and said predetermined signal pattern,
   and smoothing means to smooth the grease for immediate reuse.

4. An optical correlator for recognizing signal patterns comprising in combination:
   a transparent endless belt which moves as a function of time;
   non-drying grease on the belt, said grease having an optical transmittance dependent on the thickness of said grease;
   blade means positioned and actuated so as to vary the thickness of the grease on the belt in accordance with an input signal;
   reference means, said reference means having alternate transparent and opaque areas representative of a predetermined signal pattern;
   light intensity measuring means;
   illuminating means operable to transmit light through said belt, said grease, and said reference means into said measuring means, said measuring means detecting changes of intensity in accordance with the degree of similarity between said input signal and said predetermined signal pattern,
   and smoothing means to smooth the grease for immediate reuse.

5. An optical correlator for recognizing signal patterns comprising in combination:
   a transparent endless belt which moves as a function of time;
   non-drying grease on the belt, said grease having an optical transmittance dependent on the thickness of said grease;
   blade means positioned and actuated so as to vary the thickness of the grease on the belt in accordance with an input signal;
   a reference slide, said reference slide having alternate opaque and clear portions which correspond to an expected signal;
   light intensity measuring means;
   illuminating means operable to transmit light through said belt, said grease, and said reference slide into said measuring means, said measuring means detecting changes of intensity in accordance with the degree of similarity between said input signal and said expected signal,
   and smoothing means to smooth the grease for immediate reuse.

6. A system to determine the frequency of an input signal comprising in combination:
   a transparent flexible endless belt moving at a rate representative of real time;
   a non-drying grease on the belt, said grease being mechanically varied in thickness so as to have more or less transmittance in accordance with the input signal;
   a reference slide having a plurality of slits thereon spaced differently along their length;
   movable light intensity measuring means;
   illumination means positioned so as to cast light through the belt, grease, and reference into the measuring means in order to determine a place along the length of the slits where the spacing of the slits correlates to the spacing of the input signal on the belt as an indication of frequency,
   and smoothing means to smooth the grease for immediate reuse.

7. A code analyzing system for recognizing symbols in an otherwise unintelligible input signal comprising in combination:

a transparent flexible endless belt moving at a rate representative of real time;

non-drying grease on the belt, said grease being mechanically varied so as to have more or less transmittance in accordance with the input signal;

a plurality of reference means, each of said reference means being composed of alternate opaque and clear areas in a prearranged pattern representative of the desired symbol;

illumination means positioned to cast light through said belt, said grease, and said reference means;

a plurality of light intensity measuring means adapted to determine which of the reference means is passing a maximum of light as an indication of reception of the corresponding symbol, and smoothing means to smooth the grease for immediate reuse.

References Cited

UNITED STATES PATENTS

| | | | |
|---|---|---|---|
| 1,681,460 | 8/1928 | Bruhn | 346—21 |
| 2,340,562 | 2/1944 | Rey | 346—21 X |
| 2,391,451 | 12/1945 | Fischer | 178—7.5 |
| 2,422,140 | 6/1947 | Sinnett | 178—6.6 |
| 3,155,451 | 11/1964 | Dunster et al. | 250—219 |
| 3,252,143 | 5/1966 | Sundblad | 88—10 |
| 3,274,565 | 9/1966 | Wright | 178—6.6 |

FOREIGN PATENTS 469,916    9/1937    Great Britain.

RALPH G. NILSON, *Primary Examiner.*

J. D. WALL, *Assistant Examiner.*